US006016183A

United States Patent [19]

Yamamoto

[11] Patent Number: 6,016,183

[45] Date of Patent: Jan. 18, 2000

[54] CONTINUOUS MOTION PICTURE SYSTEM

[76] Inventor: Masaomi Yamamoto, 18-34 Moegino, Aoba-ku, Yokohama-shi, Kanagawa-ken, Japan

[21] Appl. No.: 08/938,910

[22] Filed: Sep. 26, 1997

[30] Foreign Application Priority Data

Feb. 20, 1997 [JP] Japan .................................. 9-053894
Jul. 15, 1997 [JP] Japan .................................. 9-207214

[51] Int. Cl.[7] ............................................ G03B 25/00
[52] U.S. Cl. ............................................ 352/100
[58] Field of Search .................................... 352/100

[56] References Cited

U.S. PATENT DOCUMENTS

| | | | |
|---|---|---|---|
| 917,587 | 4/1909 | Good | 352/100 |
| 978,854 | 12/1910 | Czerniewski | 352/100 |
| 2,299,731 | 10/1942 | Arendt | 352/100 |
| 3,694,062 | 9/1972 | Koenig | 352/100 |
| 3,704,064 | 11/1972 | Sollogoub et al. | 352/100 |
| 3,951,529 | 4/1976 | Gandia | 352/100 |
| 4,179,198 | 12/1979 | Brachet et al. | 352/100 |
| 4,383,742 | 5/1983 | Brachet et al. | 352/100 |
| 5,108,171 | 4/1992 | Spaulding | 352/100 |

*Primary Examiner*—Russell Adams
*Attorney, Agent, or Firm*—Jordan and Hamburg LLP

[57] ABSTRACT

A continuous motion picture system for operation in conjunction with a vehicle carrying passengers along a running path is disclosed. The system has screen boxes having a screen and a projector for displaying a still picture for a duration of a display period. The screen boxes are serially disposed at intervals of a given distance provided in place along the running path of the vehicle. The system also has a device for supplying picture signals of a sequence of fames, which depict motion when viewed sequentially, to the projectors of the screen boxes such that each of the projectors receives a respective one of the frames of the sequence of frames in correspondence with the serial disposition of the screen boxes. The system further has a sensor for sequentially triggering the screen boxes to individually display the respective one of the frames as a still picture for the display period in correspondence with the vehicle passing the screen boxes. Passengers can see the pictures as motion pictures for guidance or publicity when the vehicle is in motion. It is easy for the workers to change and it takes a short time to change from the present still pictures to the next still pictures.

17 Claims, 24 Drawing Sheets

CONTINUOUS MOTION PICTURE SYSTEM

BACKGROUND OF THE INVENTION

This invention relates to a continuous motion picture system having screen boxes for motion picture which is mounted on the vending machines, sign boards or information boards for guidance and/or publicity, and/or can be seen the continuous motion pictures for guidance and/or publicity projected from a moving object, such as a train on a rail track, an automotive vehicle on a road, an escalator, or an elevator.

A conventional screen box for picture used in the continuous motion picture system comprises the base plate, the sideframe mounted as one or fixed to the circumference of the base plate, covering the outer part of the base plate except at the top thereof, the cover body mounted with covering to the front of the sideframe, sceably inside thereof, the openable cover for closing the top opening of the sideframe, the mounted recess arranged in the front region of the sideframe for accepting the still picture as continuous motion which is detachably loaded from a top opening of the sideframe, inside rather than thereof and at least one or more blinking lights, e.g. strobe lamps or flash lamps, mounted in the mounted recess for accepting the still picture as continuous motion which is detachably loaded from a top opening of the sideframe illuminated with blinking.

Since the conventional screen boxes for picture used in the continuous motion picture system illuminates the still picture with blinking using the blinking light, people have to change from still pictures to other still pictures by the operation by hand. Therefore, it is too hard to conduct, moreover, the work is troublesome.

SUMMARY OF THE INVENTION

In view of foregoing, it is an object of the present invention to provide a continuous motion picture system having successive screen boxes for display of motion pictures which can project the motion pictures for guidance or publicity.

It is another object of the present invention to provide a continuous motion picture system having successive screen boxes for display of motion pictures that is easy to change from the present still pictures to other still pictures and takes a short time to change them.

The above and future objects and novel features of the invention will more fully appear from the foiling detailed description when the same is read in connection with the accompanying drawings. It is to be expressly understood, however, that the drawing is for the purpose of illustration only and is not intended as a definition of the invention.

DETAILED DESCRIPTION OF THE INVENTION

Preferred embodiments of the present invention are described in detail below referring to the accompanying drawings.

FIGS. 1 to 7 illustrate a first embodiment of the present invention. The numeral 1 is a vehicle carrying passengers or electric train having a row of windows and traveling on two rails 2,2 at a running path 3.

Figure 1:
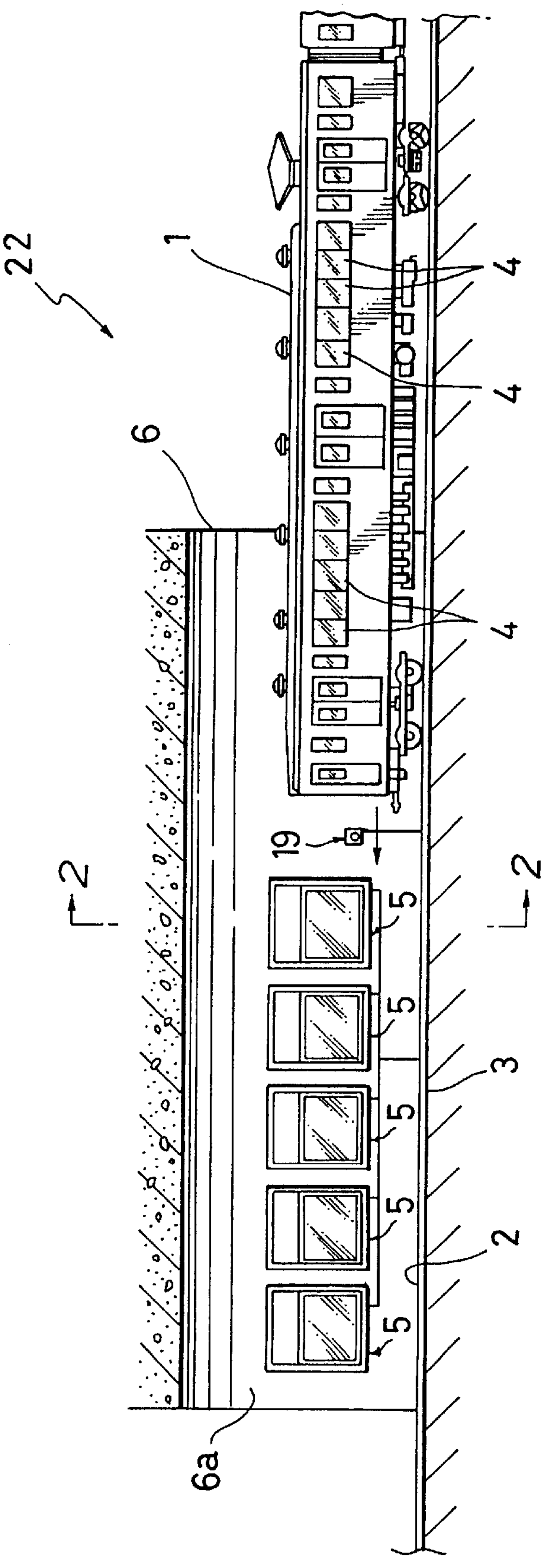
FIG. 1 is a front view of a first embodiment of the present invention.
Figure 2:
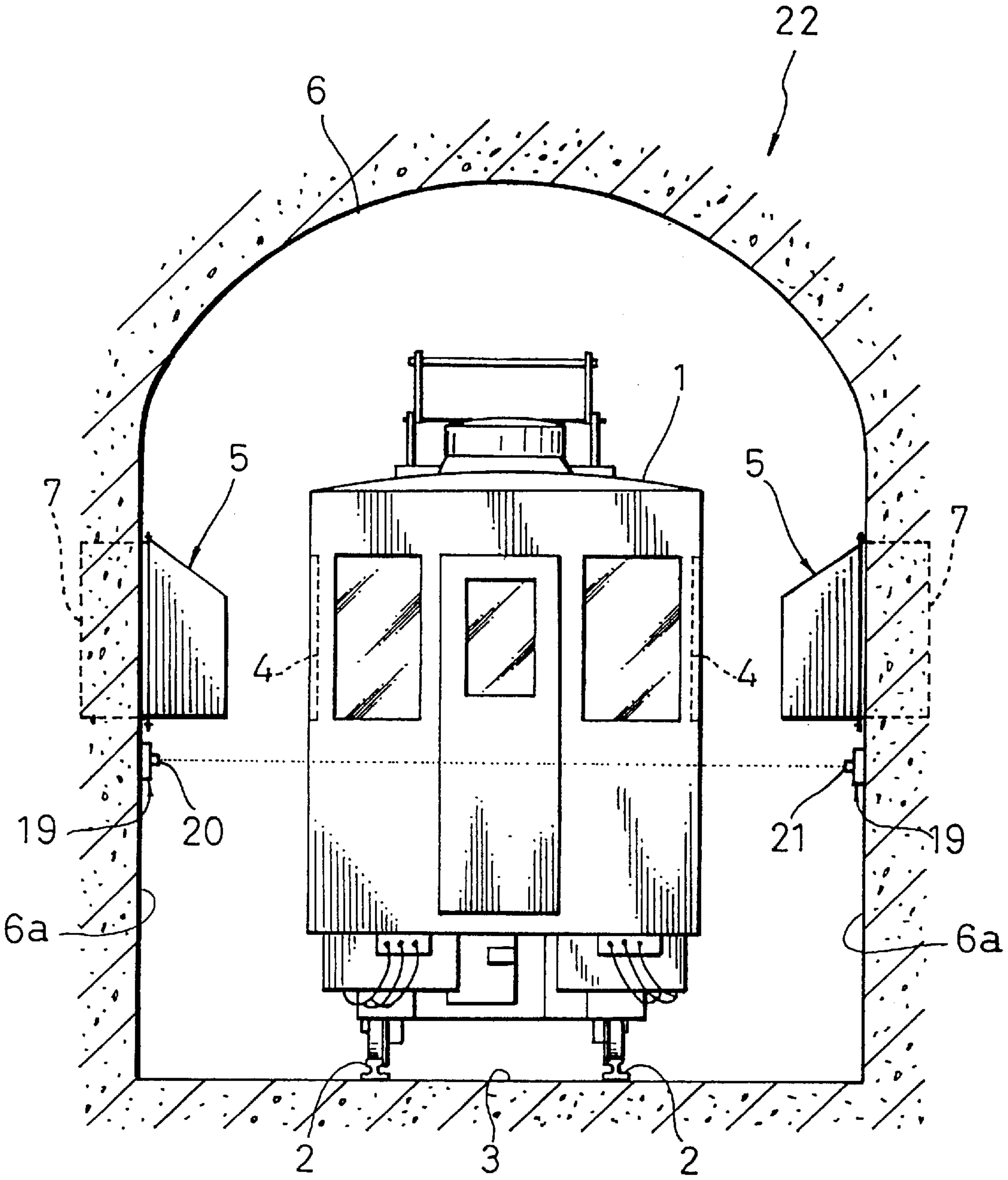
FIG. 2 is an expanded cross-sectional view taken along the line 2—2 of FIG. 1.
Figure 3:
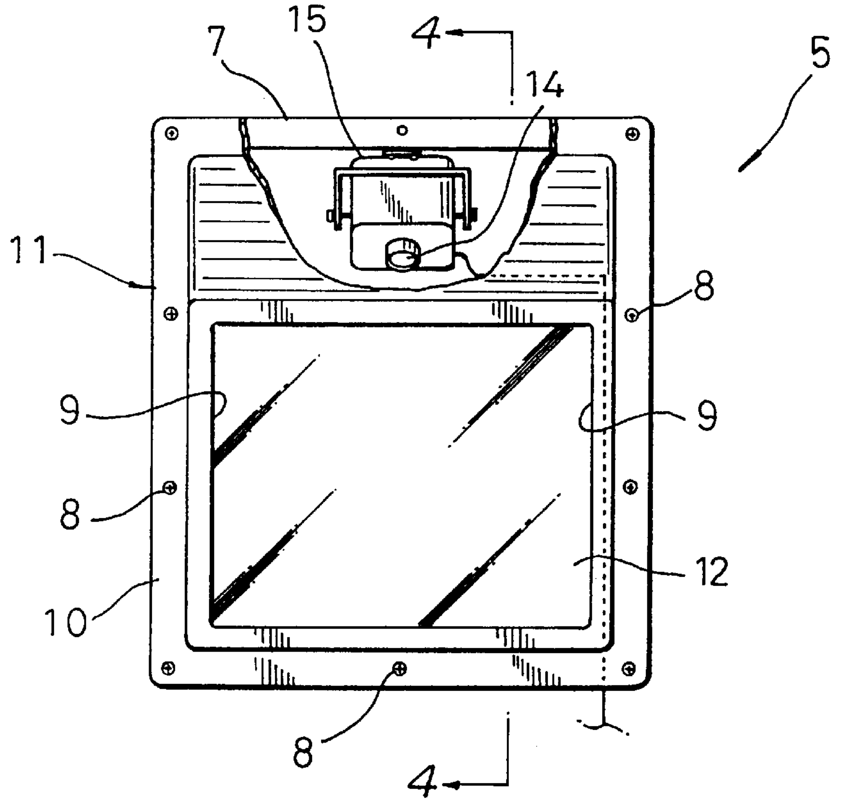
FIG. 3 is a partial cross-sectional front view of a screen box body of the first embodiment of the present invention.
Figure 4:
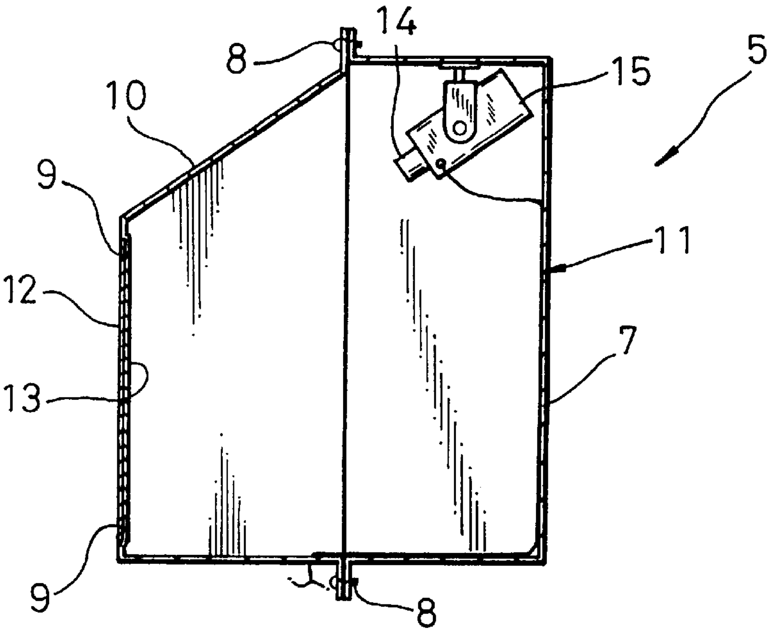
FIG. 4 is a cross-sectional view taken along the line 4—4 of FIG. 3.
Figure 5:
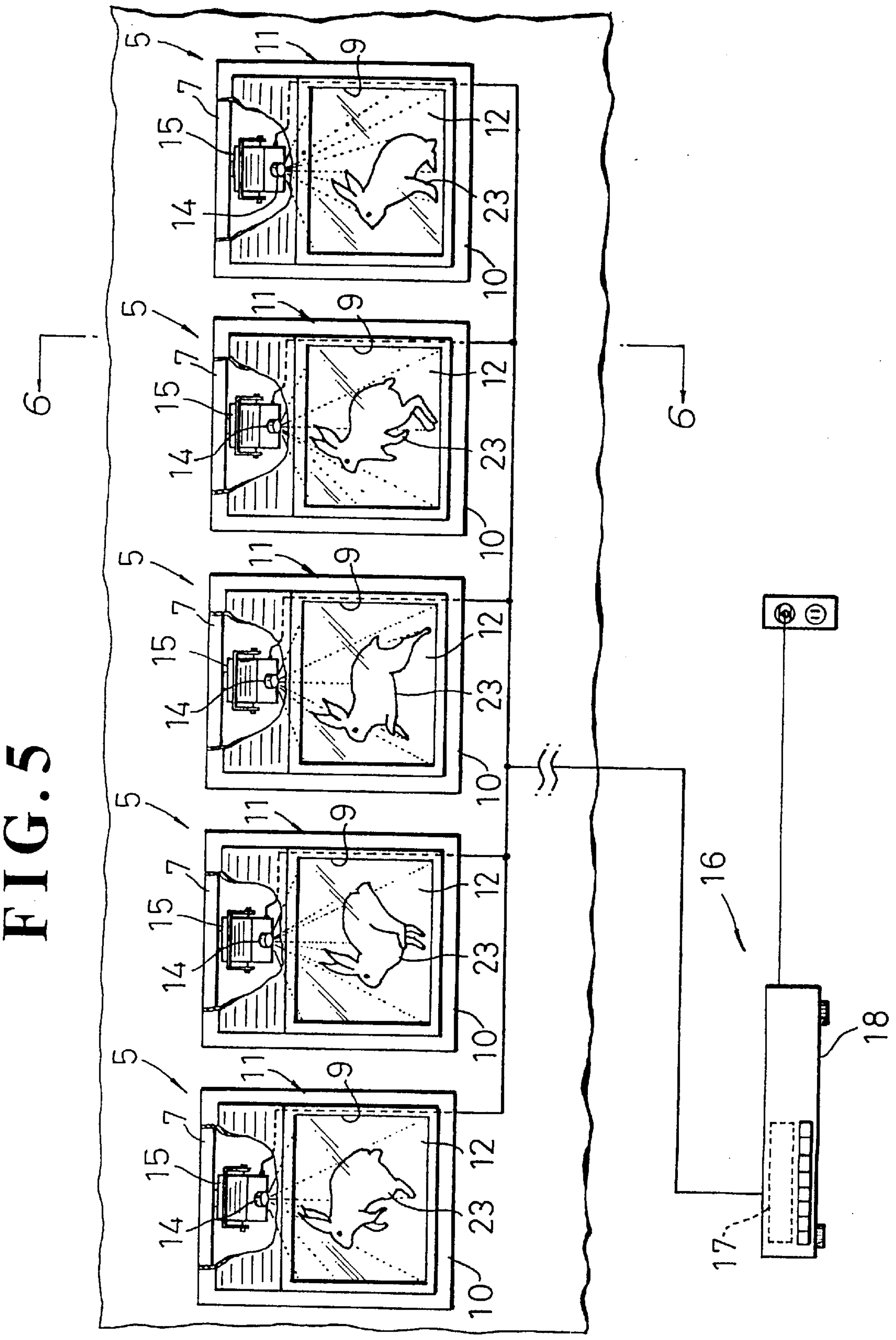
FIG. 5 is an environmental front and schematic view of a screen of each of a plurality of screen boxes of the first embodiment of the present invention.
Figure 6:
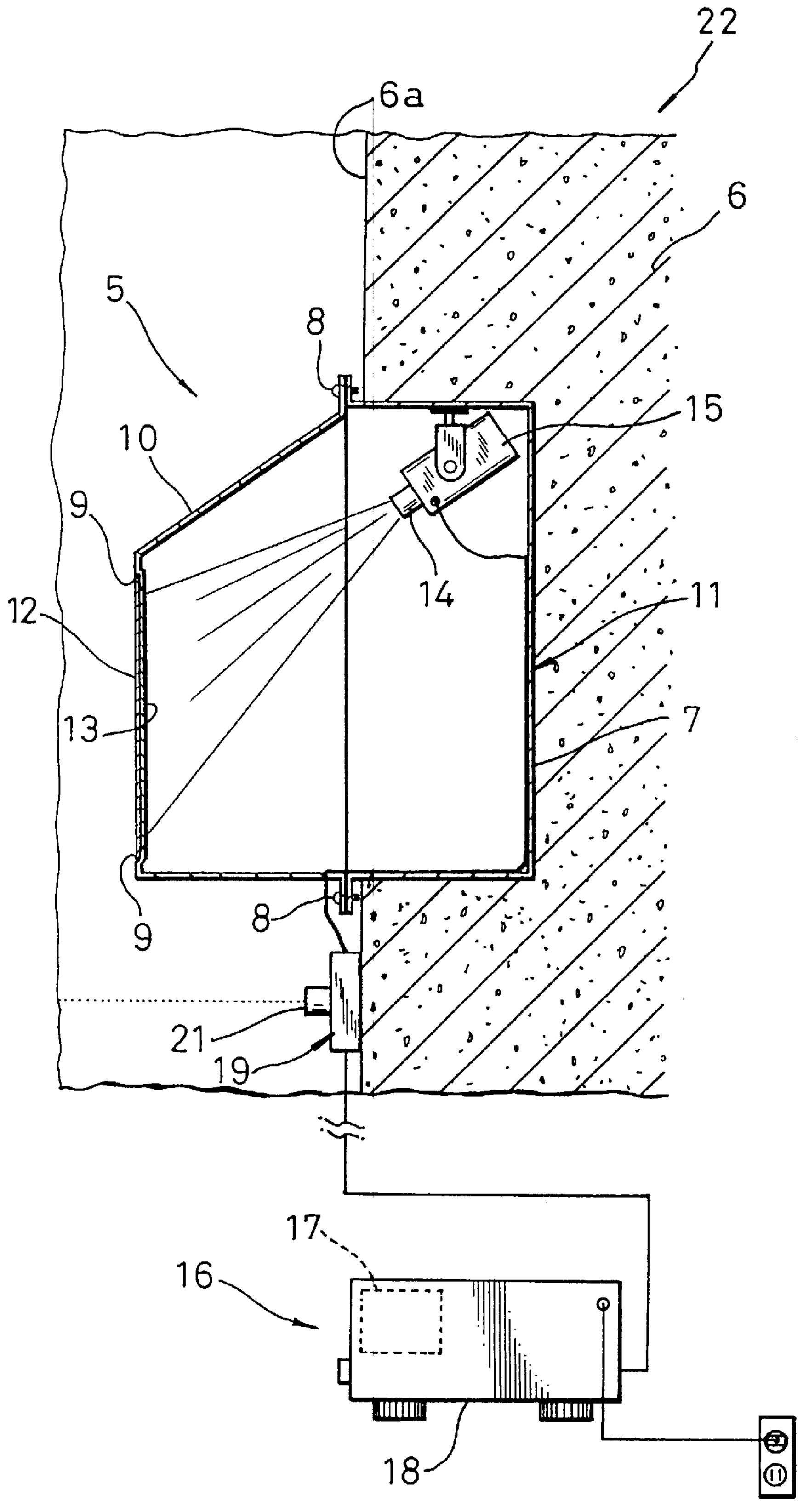
FIG. 6 is an expanded cross-sectional view taken along the line 6—6 of FIG. 5.
Figure 7:
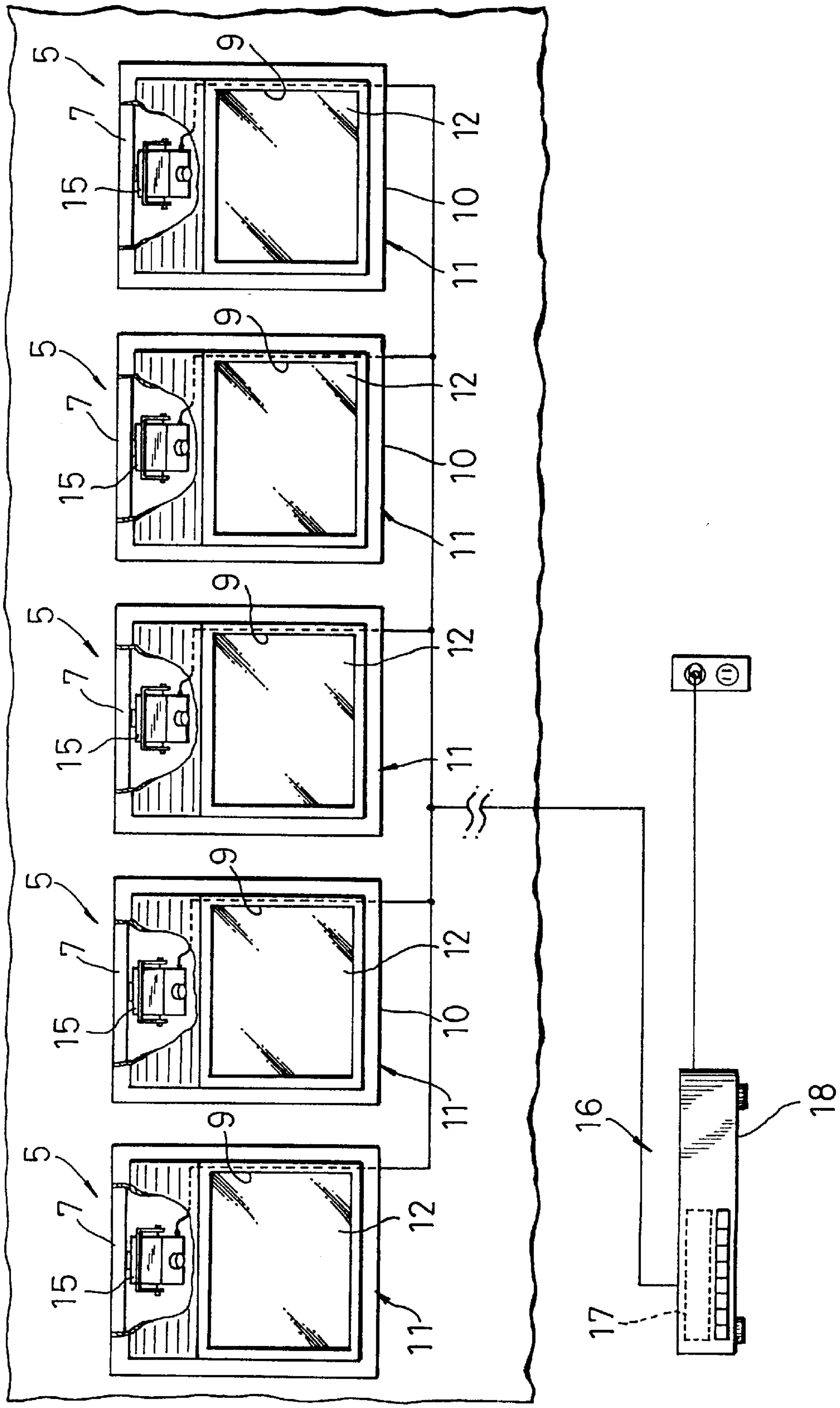
FIG. 7 is front and schematic view of the screen boxes of the first embodiment of the present invention.
Figure 8:
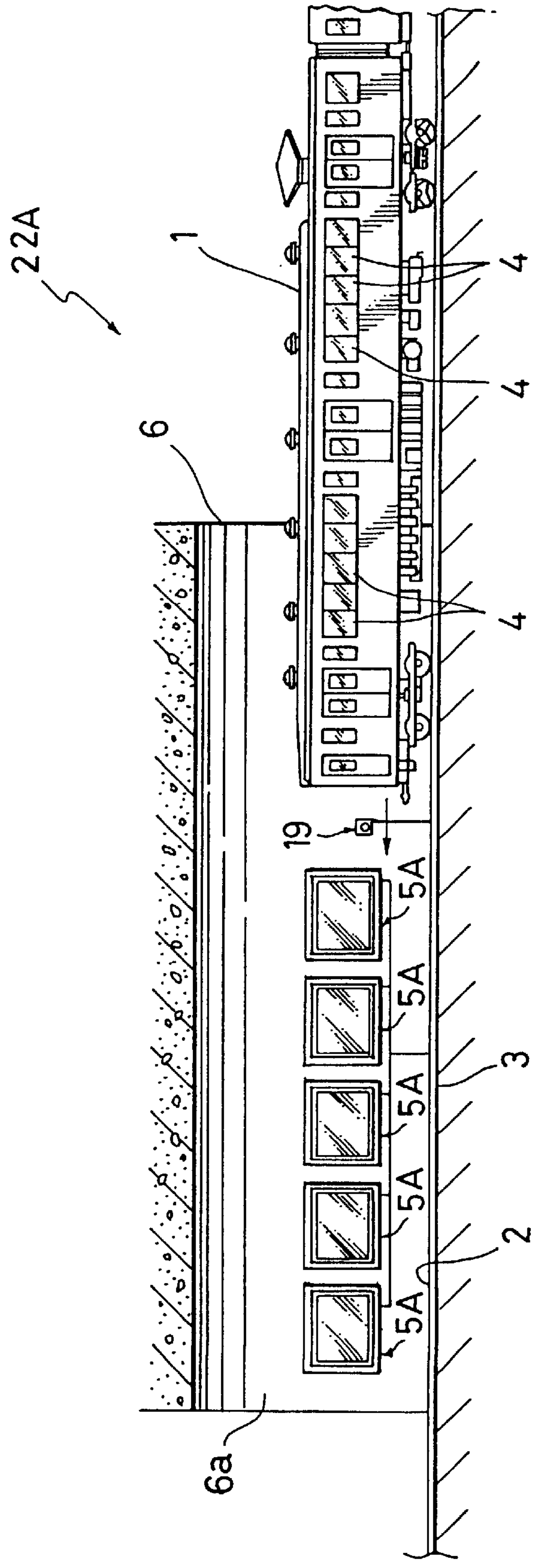
FIG. 8 is a front view of a second embodiment of the present invention.
Figure 9:
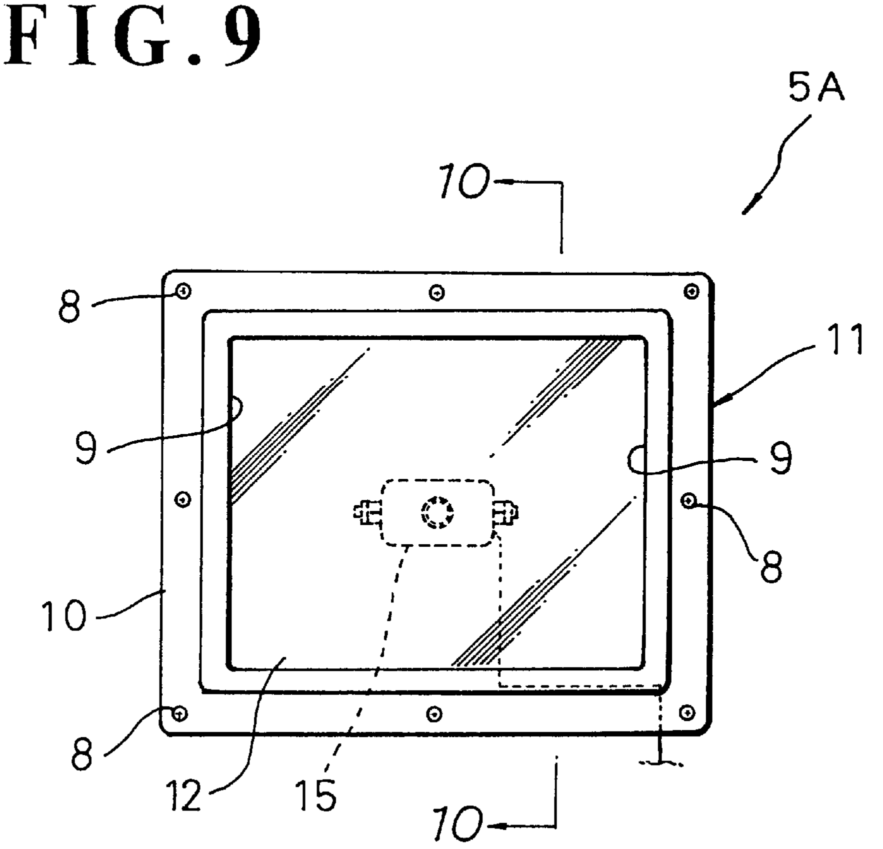
FIG. 9 is a front view of a screen box body of the second embodiment of the present invention.
Figure 10:
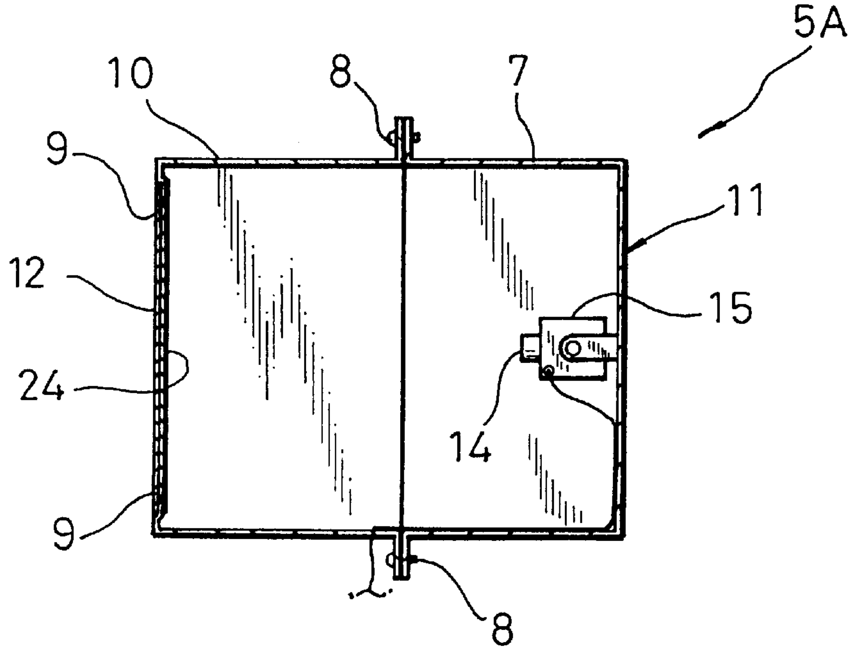
FIG. 10 is a cross-sectional view taken along the line 10—10 of FIG. 9.
Figure 11:
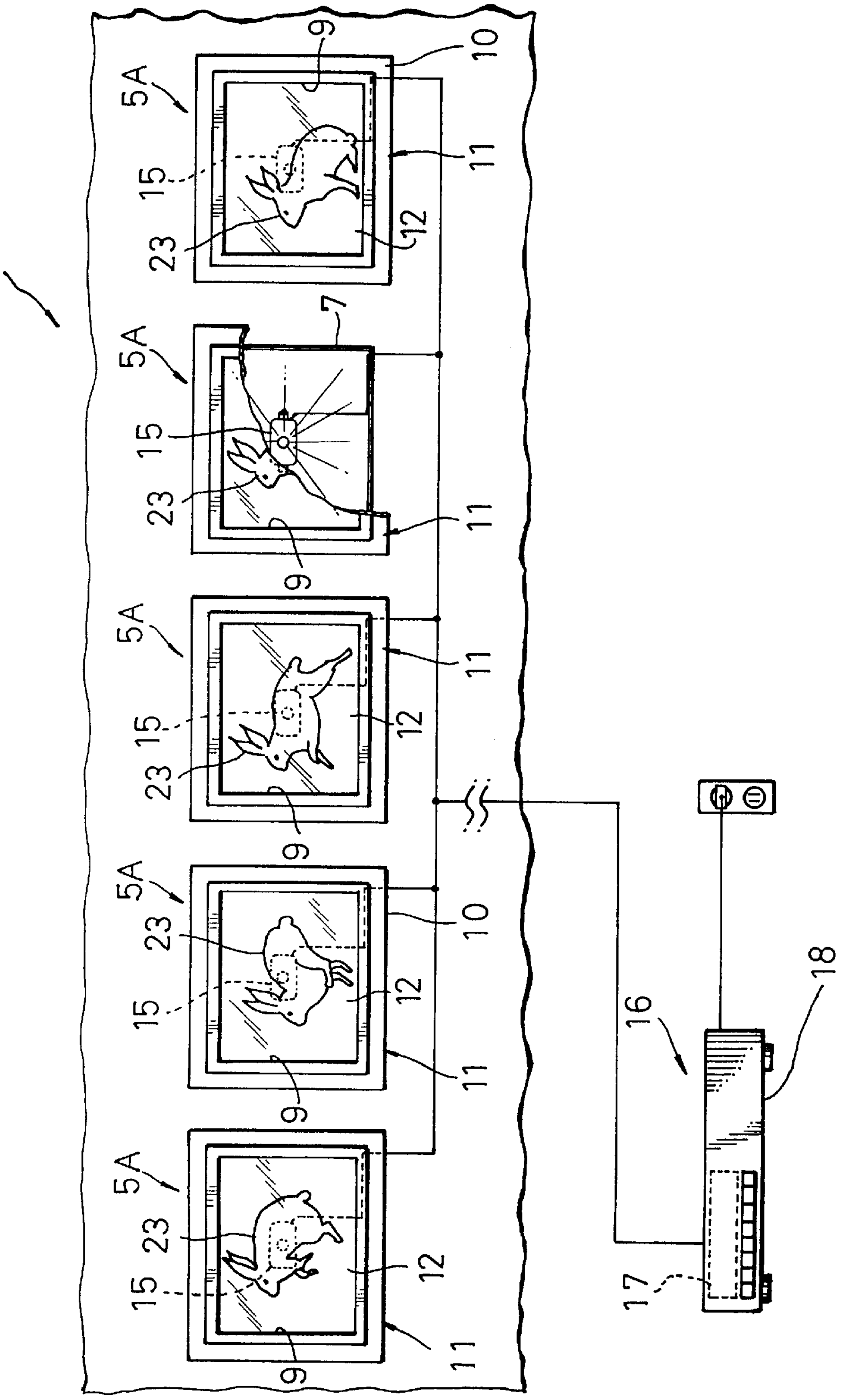
FIG. 11 is an environmental front and schematic view of a screen of each of a plurality of screen boxes of the second embodiment of the present invention.

There is a tunnel 6 provided in place along the running path 3 of the vehicle 1. The tunnel 6 has screen boxes for motion pictures 5 serially disposed at intervals of a given distance on the inner wall 6*a* thereof so that the screen boxes 5 can be seen from the windows 4 of the vehicle 1 traveling on the running path 3. As best shown in FIGS. 3 and 4, each of the screen boxes 5 comprises a screen box body 1, a screen 12 with a polarized light screen 13, and a liquid crystal projector 15.

The screen box body 11 comprises a rear 7 in the shape of a box, capable of being fixably mounted into the inner wall 6*a* of the tunnel 6, and a front 10 being removably mounted with a covering in front of the rear 7 with a number of screws 8. The screen box body 11 defines an opening 9 in the front 10 thereof, and is sloped at a top thereof. The screen 12, such as a glass screen or an acrylic screen, is mounted in the opening 9 on the front 10 of the screen box body 11. The screen 12 has a back side upon which the still picture is projected and a front side at which the still picture is viewed.

The polarized light screen 13, such as a polarized light glass or a polarized light film, is fixed or attached by adhesive, or by any other well known attachment means in the art, to the back side of the screen 12 or to the opening 9 of the front 10, which has usually non-clear characteristics so that people can see inside from outside, or, when people cannot see inside thereof from outside, so that people can see the pictures from outside thereof when they are projected from inside to the polarized light screen 13 at a fixed degree.

The liquid crystal projector 15 is mounted to the top part inside the rear 7 of the screen box body 11 of the screen box 5. The projector 15 uses a blinkable backlight 14, such as a strobe lamp or a flash lamp, as a source of light capable of projecting a still picture to the polarized light screen 13 at a fixed degree.

A device for supplying picture signals 16 of a sequence of frames, which depict motion when viewed sequentially, can supply each projector 15 with the still picture signal such that each projector 15 receives a respective one of the frames of the sequence of frames in correspondence with the serial disposition of the screen boxes 5. The device for supplying picture signals 16 comprises a digital video player 18 and a digital signal distributor 17 for distributing signals of the respective ones of the frames to respective ones of the screen boxes 5.

A sensor 19 comprises a luminous device 20 and a light receiving device 21, which can conduct light to the liquid crystal projector 15 of each of the screen boxes 5 during a fixed time when the vehicle 1 moved in close to it.

A continuous motion picture system 22 having the foregoing arrangement is associated with the vehicle 1 traveling on the two rails 2,2 at the running path 3. When the vehicle 1 passes in front of the sensor 19, the sensor 19 is activated. When the vehicle 1 passes in front of the screen boxes 5 serially disposed at intervals of a given distance on the inner wall 6*a* of the tunnel 6, people traveling within this vehicle 1 can see, in order, a series of the still pictures 23 with blinking condition projected onto the polarized light screen 13 of the screen boxes 5 through the windows 4 of the vehicle 1. The series of still pictures 23 with blinking condition, which can be seen by people in order, are projected onto the polarized light screen 13 of the screen boxes 5 so as to reproduce the motion when the screen boxes 5 are sequentially viewed by the passengers of the vehicle 1.

Other embodiments of the present invention will now be described referring to FIGS. 8 to 26. Through the drawings of the embodiments, like components are denoted by like numerals as of the first embodiment and will not be further explained.

A second embodiment of the present invention shown in FIGS. 8 to 11 is distinguished from the first embodiment by an opaque or translucent screen 24 and screen boxes 5A. The opaque or translucent screen 24 can display the projected picture such that people can see the picture projected from inside thereof at a fixed degree. Each of the screen boxes 5A includes the liquid crystal projector 15 in the rear 7 of the screen box body 11. The projector 15 is positioned at the center of the rear part of the rear 7, opposite from the opaque or translucent screen 24. A continuous motion picture system 22A with the screen boxes 5A according to the second embodiment will provide the same effects as the first embodiment.

Figure 12:
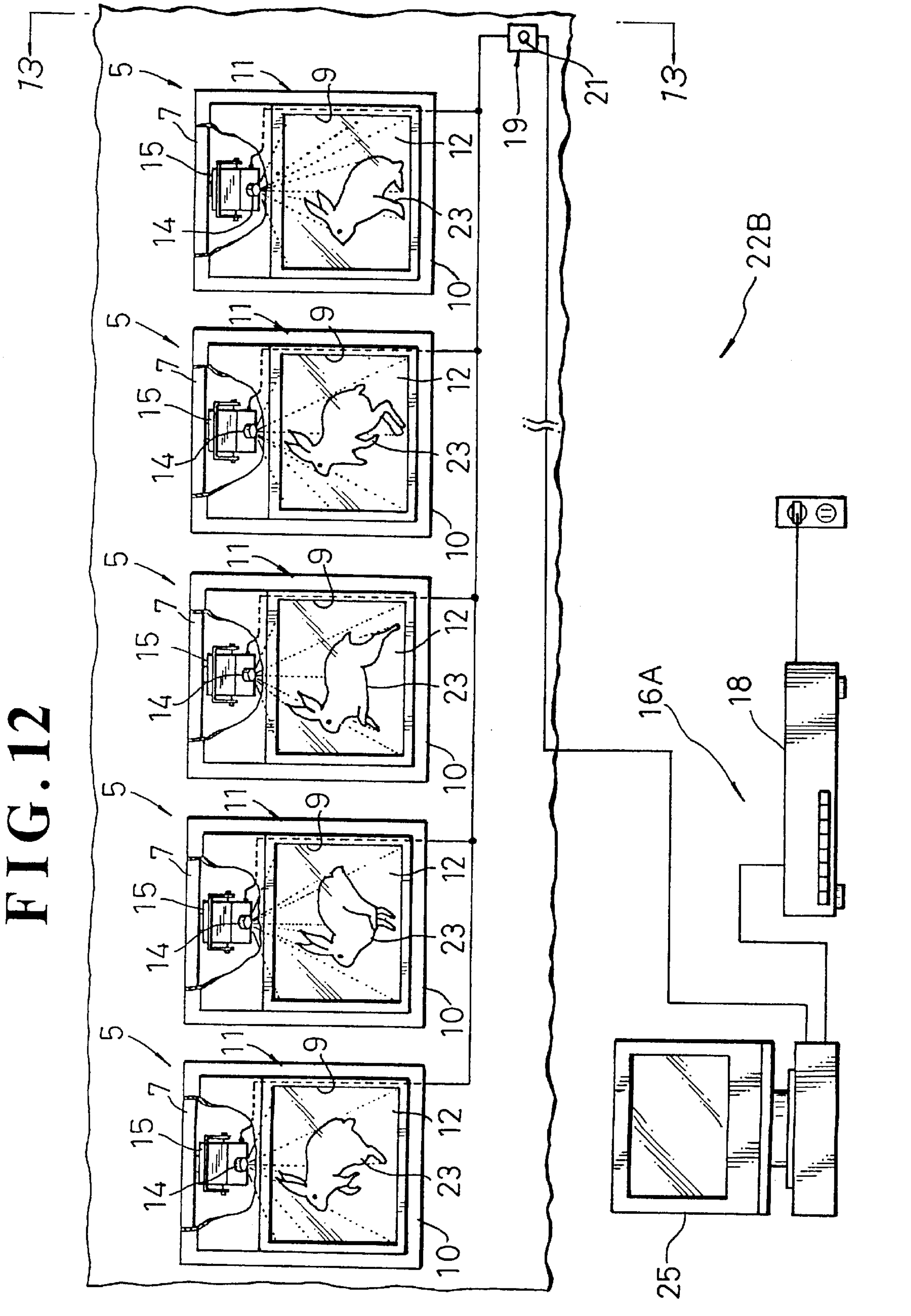
FIG. 12 is an environmental front and schematic view of a screen of each of a plurality of screen boxes of a third embodiment of the present invention.
Figure 13:
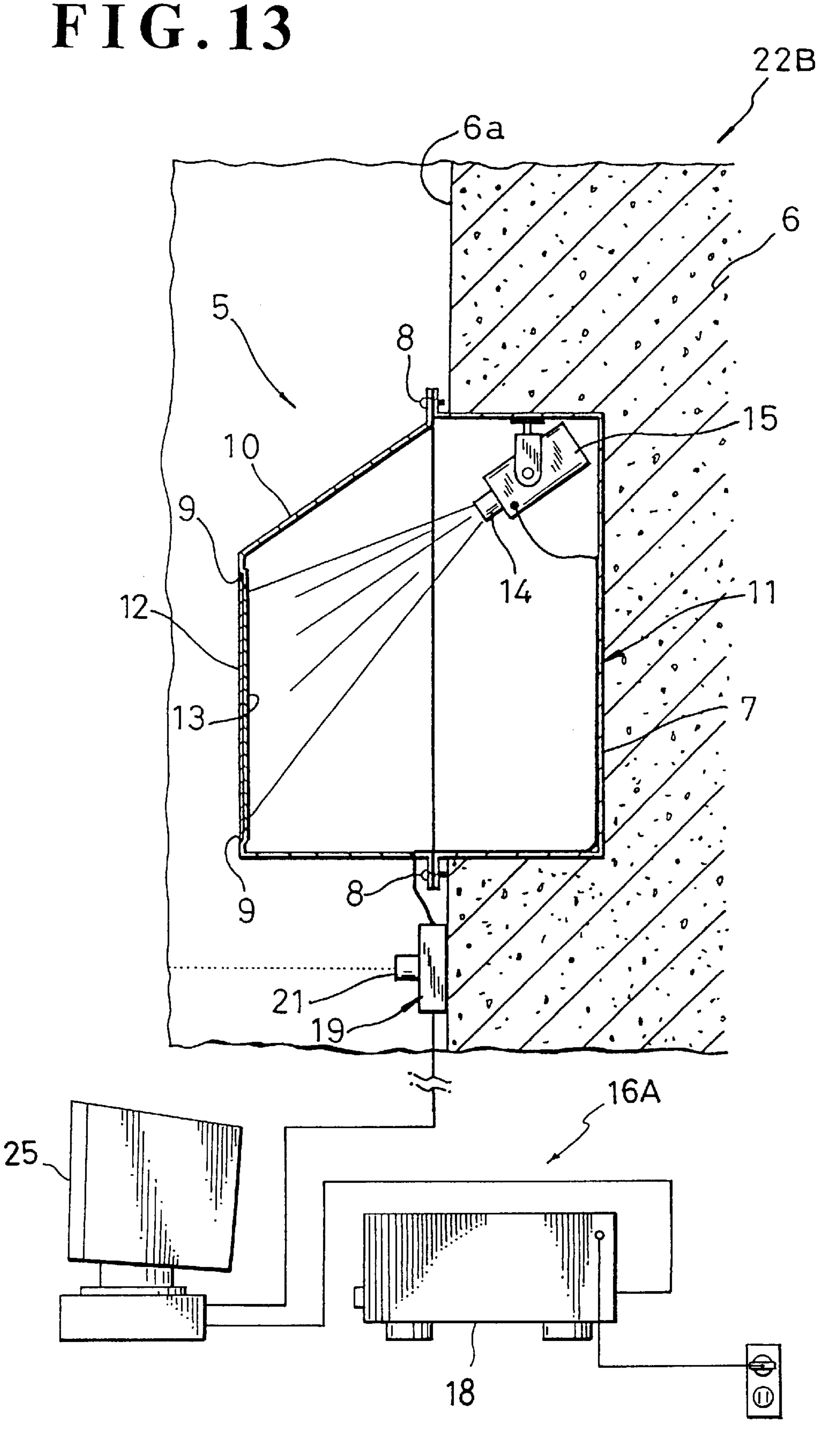
FIG. 13 is an expanded cross-sectional view taken along the line 13—13 of FIG. 12.

A third embodiment of the present invention shown in FIGS. 12 and 13 is distinguished from the first embodiment by the fact that the device for supplying picture signals 16 is replaced with another like device 16A which comprises a digital video player 18 and a personal computer 25. A continuous motion picture system 22B with the device 16A according to the third embodiment will be able to supply the still picture signals of a sequence of frames, which depict motion when view sequentially, to the liquid crystal projector 15 of each of the screen boxes 5 after the motion picture from the digital video player 18 is changed to the still picture signal by the personal computer 25.

Figure 14:
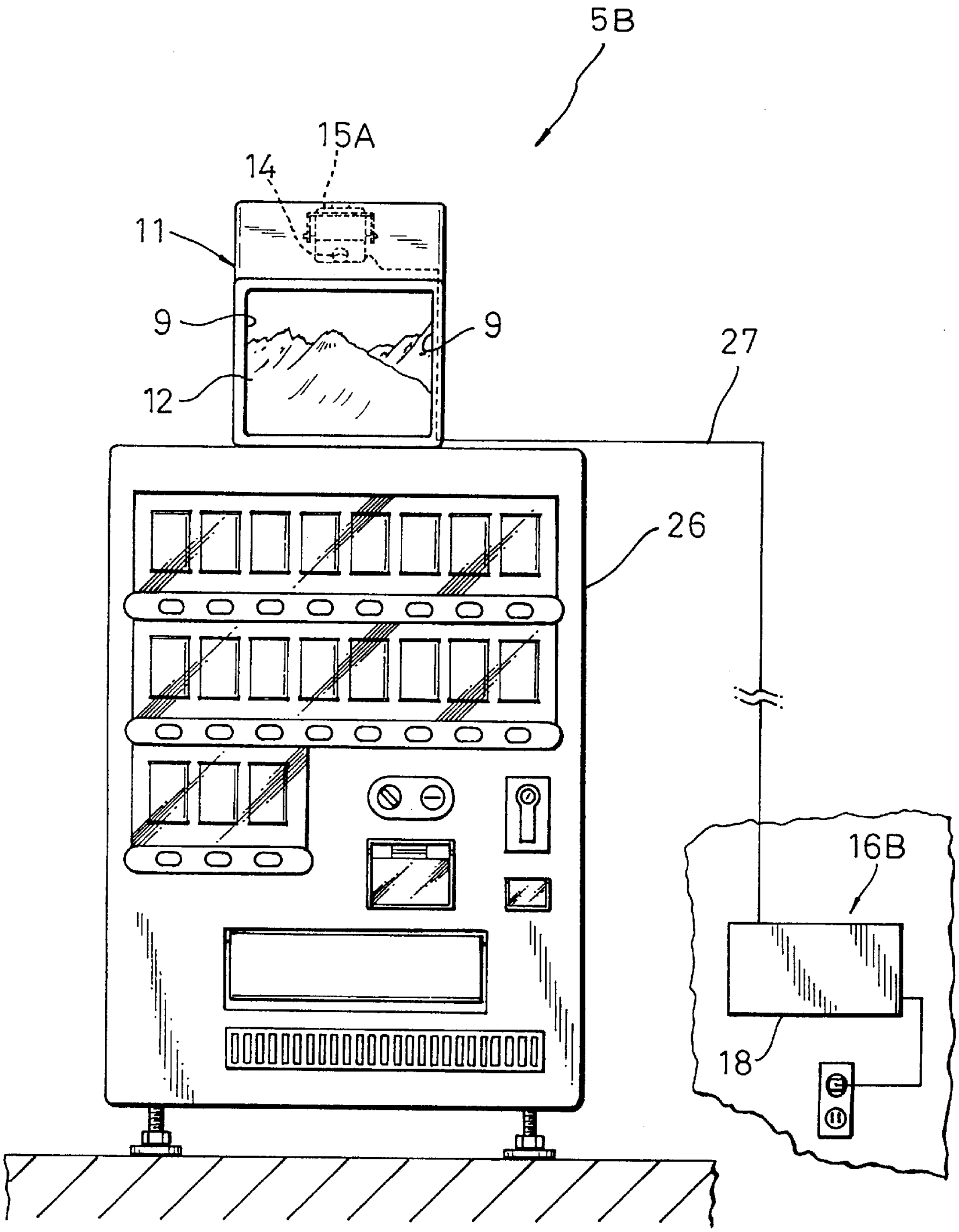
FIG. 14 is a front and schematic view of a fourth embodiment of the present invention.
Figure 15:
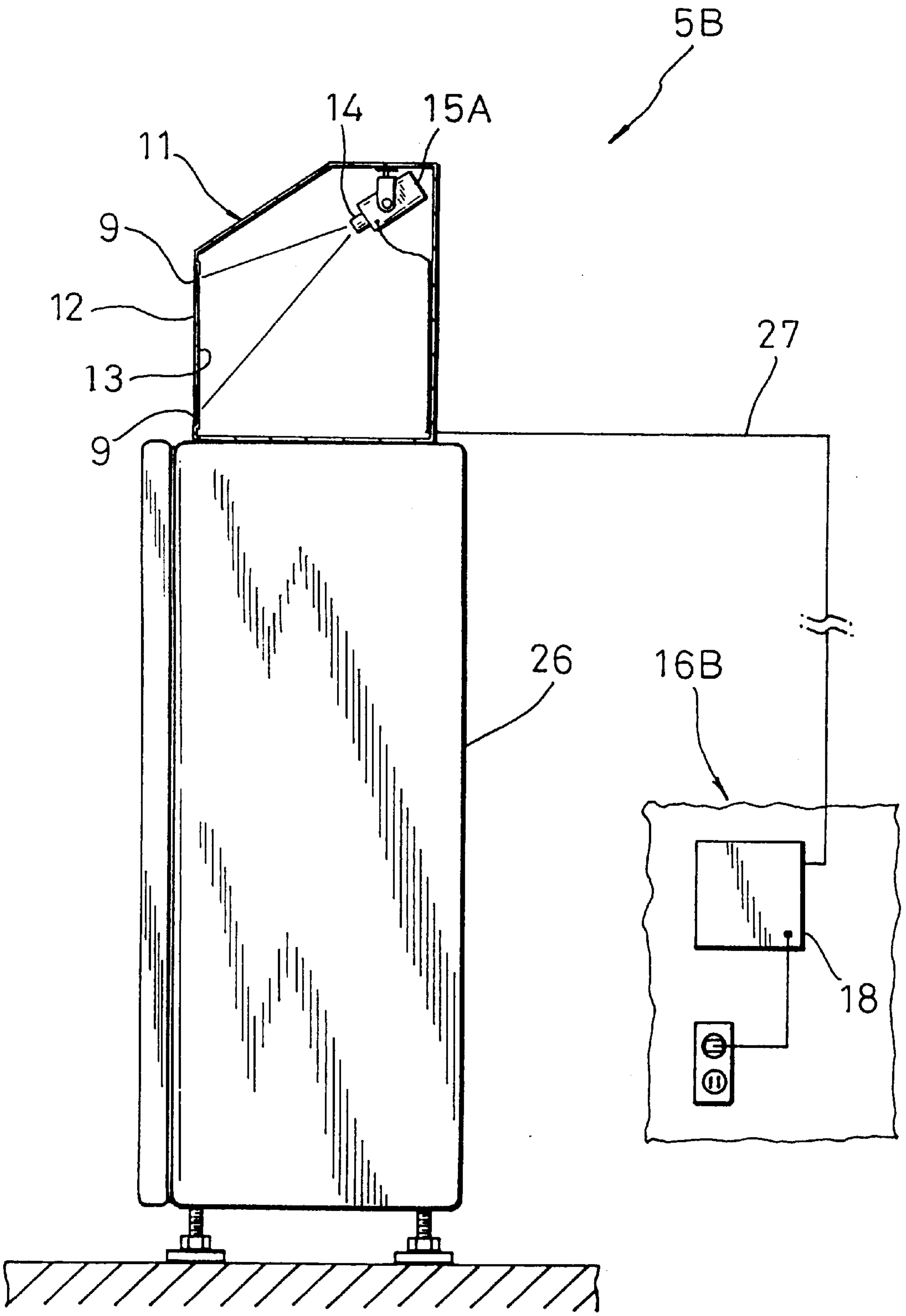
FIG. 15 is a partial cross-sectional side view of the fourth embodiment of the present invention

A fourth embodiment of the present invention shown in FIGS. 14 and 15 is distinguished from the first embodiment by the fact that the screen box body 11 is formed at one or fixed to a case housing 26 of a vending machine, sign board, or information board. Moreover, the liquid crystal projector 15 is replaced with another like projector 15A and the device for supplying picture signals 16 is replaced with another like device 16B. The liquid crystal projector 15A is used as a source of light of a continuous lighting. The device for supplying picture signals 16B is connected to the outside of the screen box body 11, which can supply the picture signal for continuous motion with the liquid crystal projector 15A using a code 27. The screen boxes 5B according to the fourth embodiment can project the motion pictures for the guidance and/or publicity on the polarized light screen 13, and they can supply the picture signal of the continuous motion to the liquid crystal projector 15A from a distant place using the screen box body 11.

Figure 16:
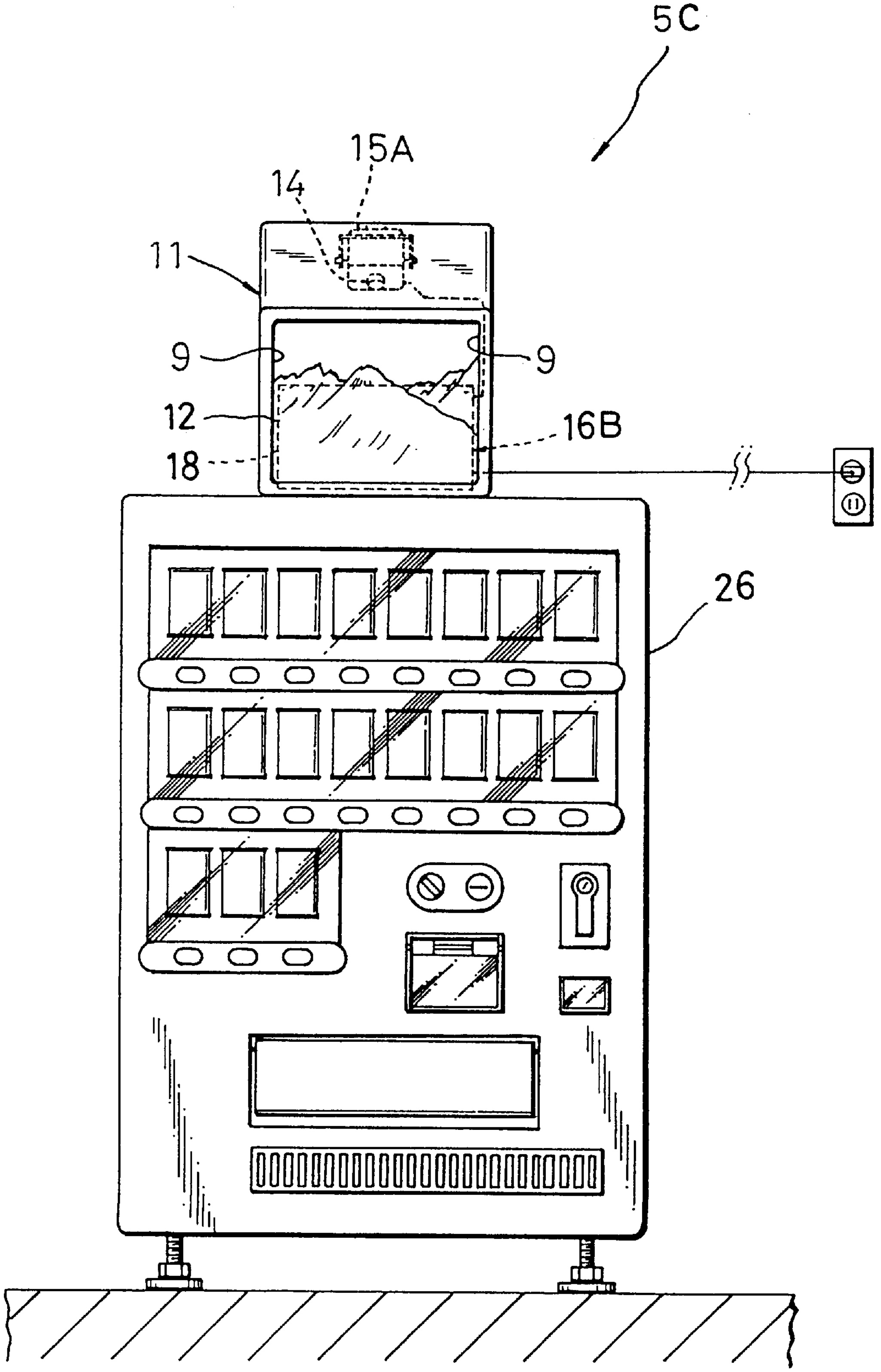
FIG. 16 is a front and schematic view of a fifth embodiment of the present invention.
Figure 17:
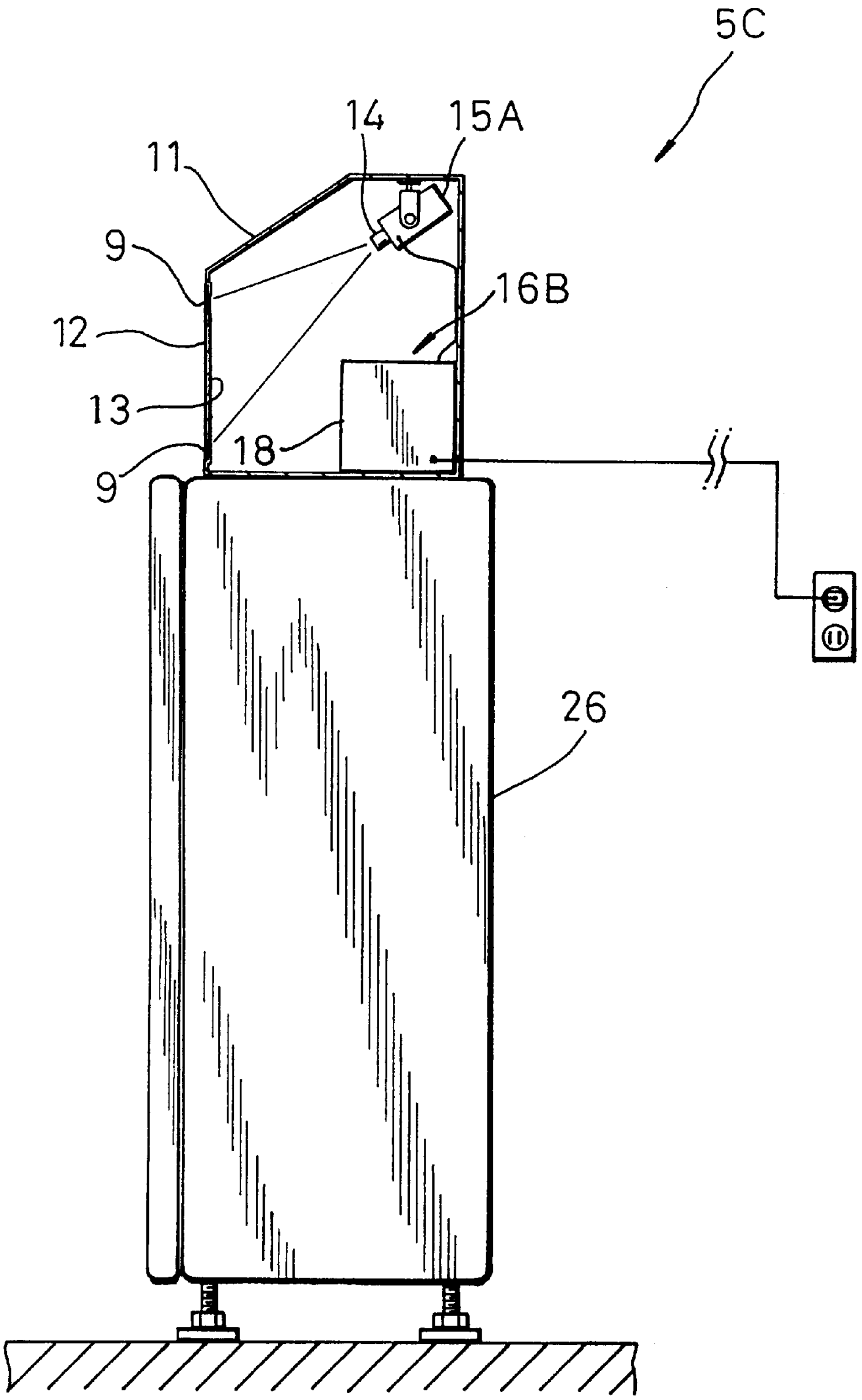
FIG. 17 is a partial cross-sectional side view of the fifth embodiment of the present invention.

A fifth embodiment of the present invention shown in FIGS. 16 and 17 is distinguished from the fourth embodiment by the fact that a device for supplying picture signals 16B is mounted into the screen box body 11. The screen boxes 5C according to the fifth embodiment may not supply the picture signal of the continuous motion to the liquid crystal projector 15A from a distant place to the screen box body 11. However, the screen boxes 5C will provide the same effects, except for the above disclosed effect of the fourth embodiment.

Figure 18:
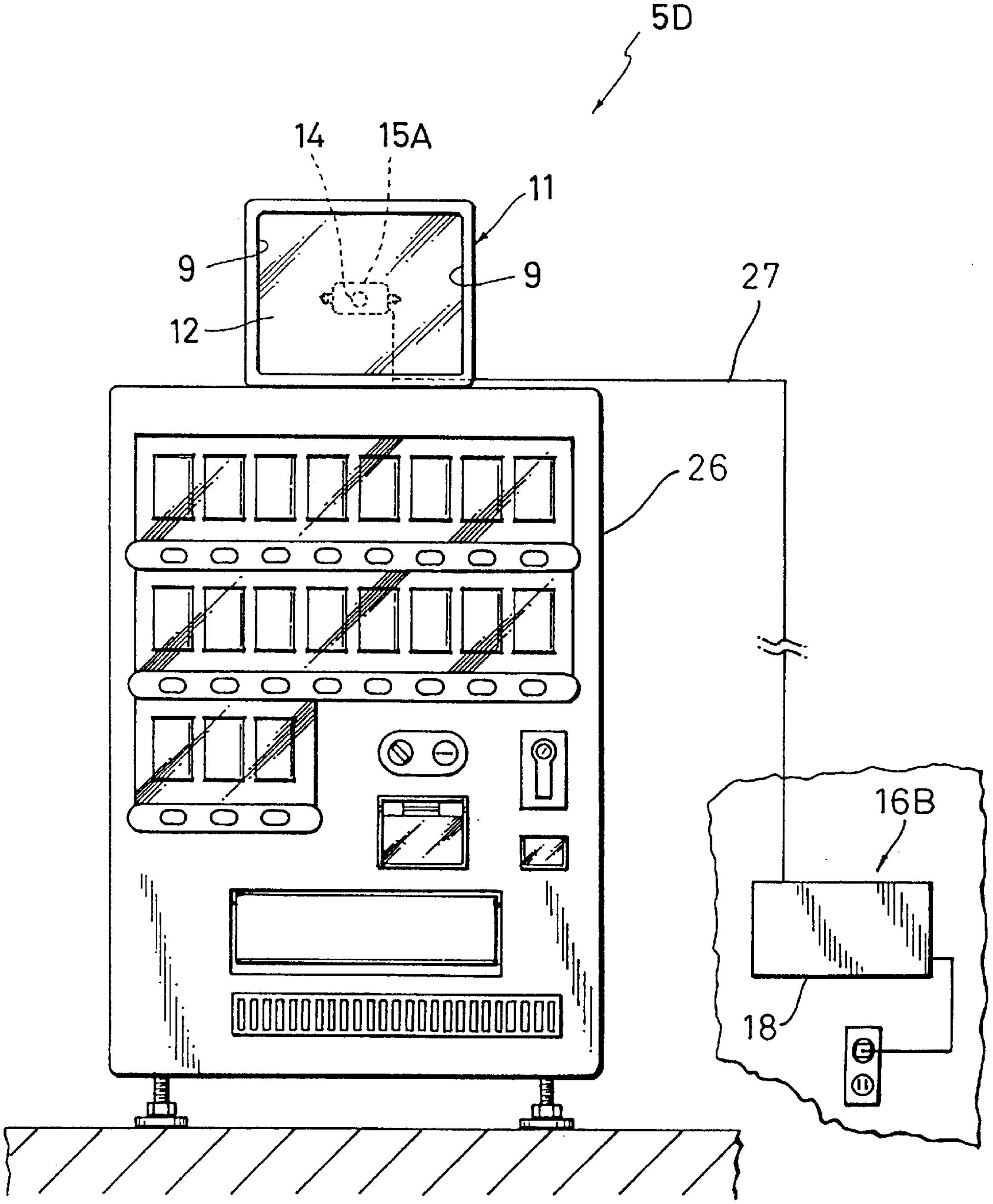
FIG. 18 is a front and schematic view showing a sixth embodiment of the present invention.
Figure 19:
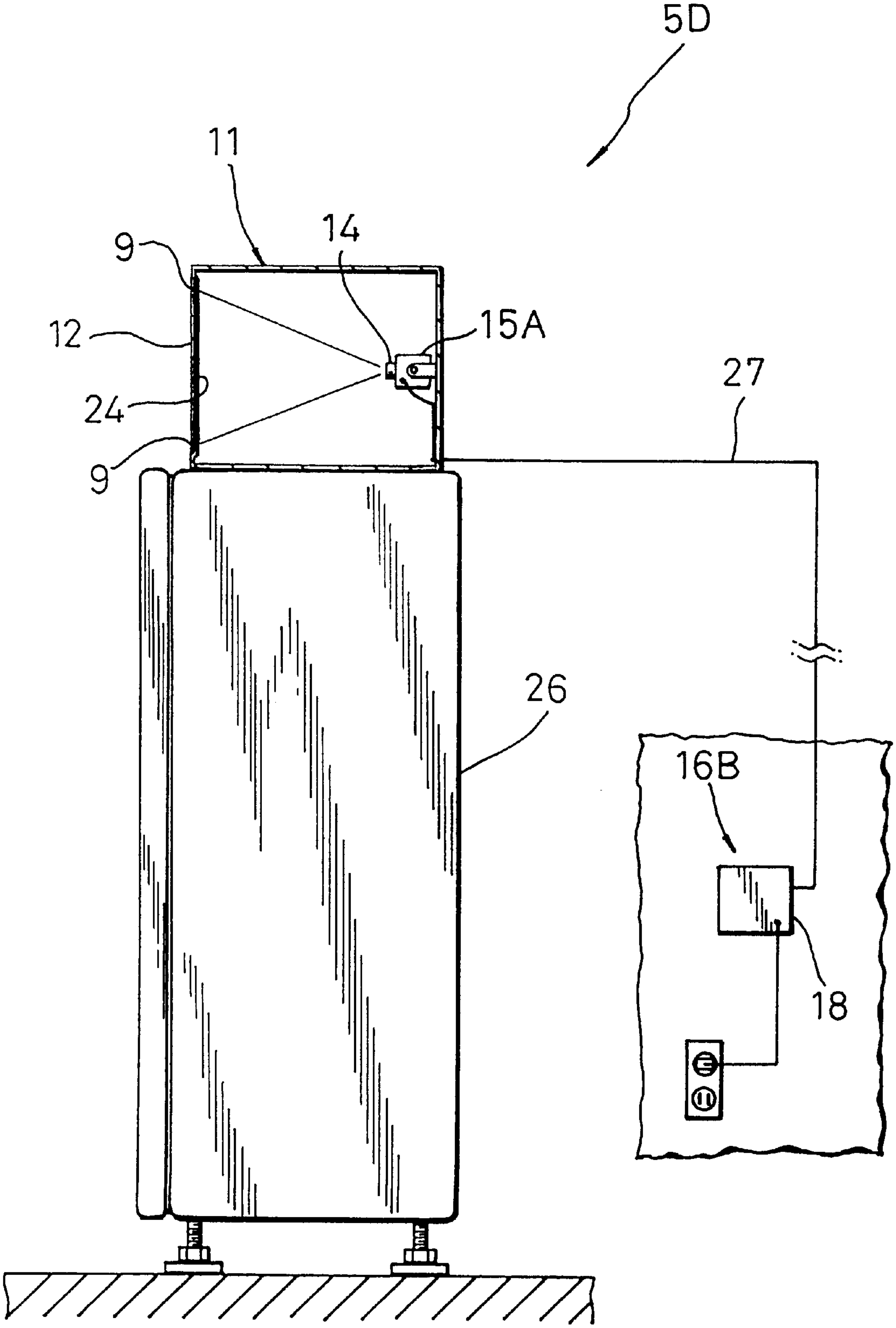
FIG. 19 is a partial cross-sectional side view of the sixth embodiment of the present invention.

A sixth embodiment of the present invention shown in FIGS. 18 and 19 is distinguished from the fourth embodiment by a translucent screen 24, and a liquid crystal projector 15A mounted into the rear 7 of the screen box body 11 and positioned at the center of the rear part of the rear 7, opposite from the translucent screen 24. The screen boxes 5D according to the sixth embodiment will provide the same effects as the fourth embodiment.

Figure 20:
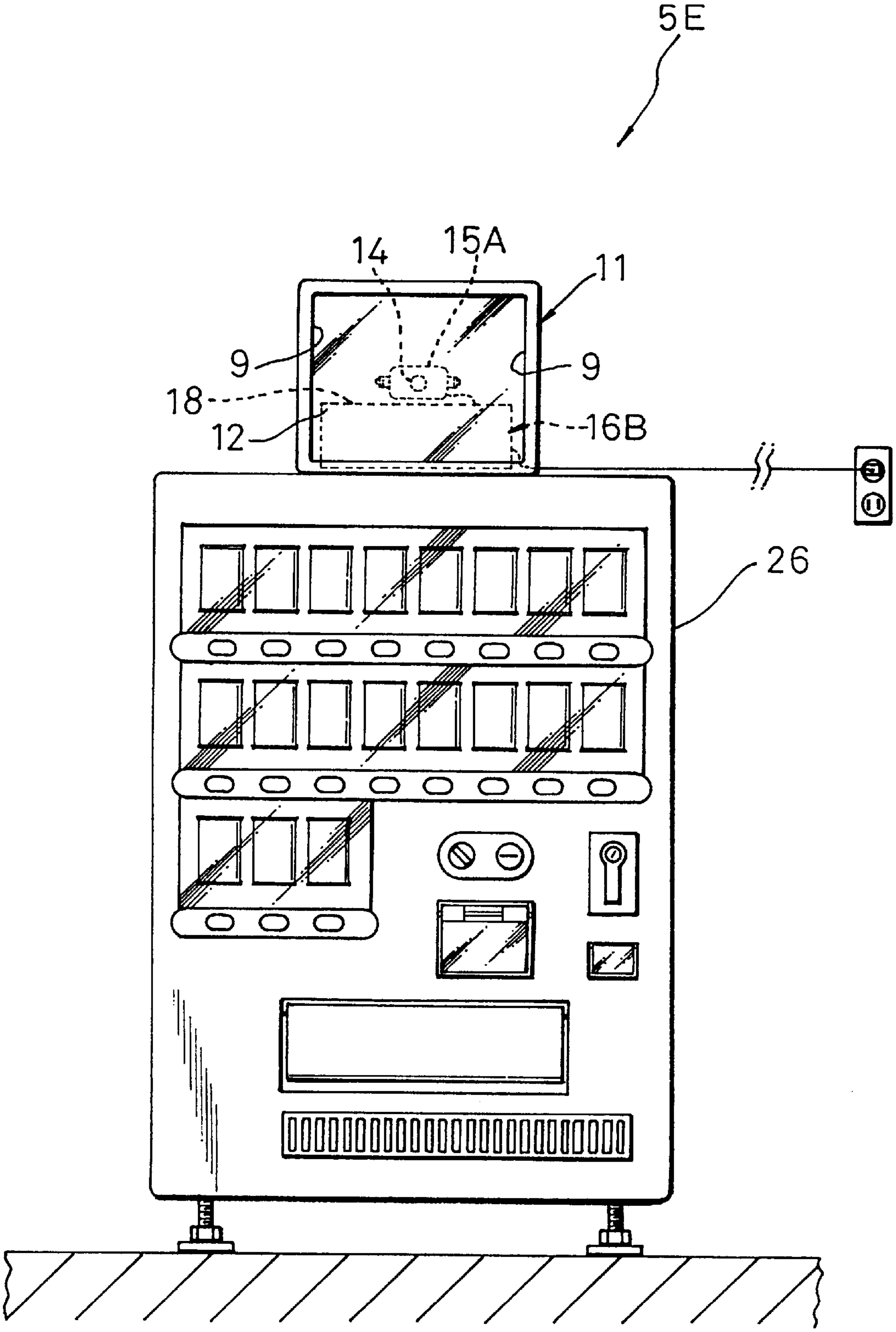
FIG. 20 is a front and schematic view of a seventh embodiment of the present invention.
Figure 21:
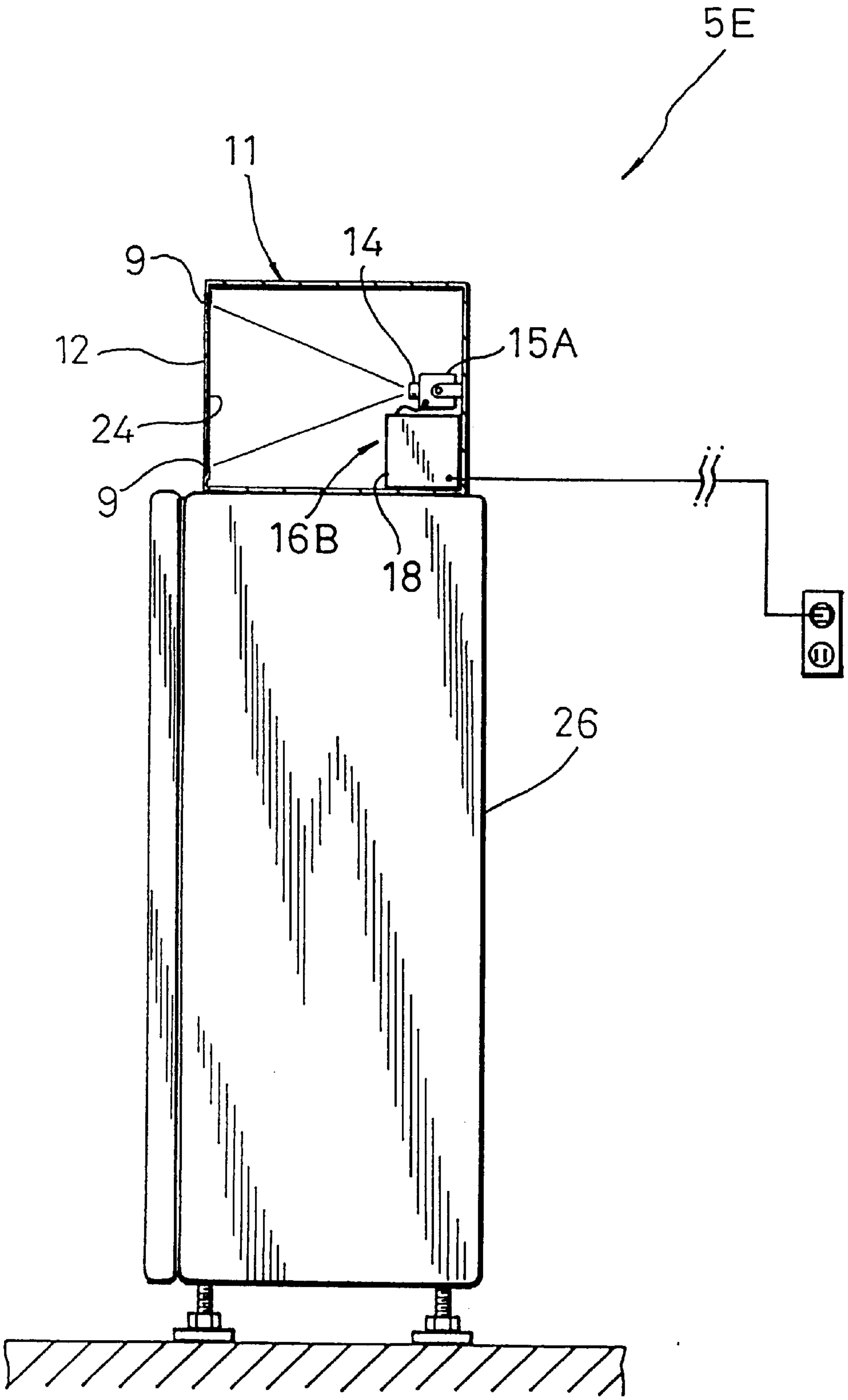
FIG. 21 is a partial cross-sectional side view of the seventh embodiment of the present invention.

A seventh embodiment of the present invention shown in FIGS. 20 and 21 is distinguished from the sixth embodiment by the fact that a device for supplying picture signals 16B is mounted into the screen box body 11. The screen boxes 5E according to the seventh embodiment will provide the same effects as the sixth embodiment.

Figure 22:
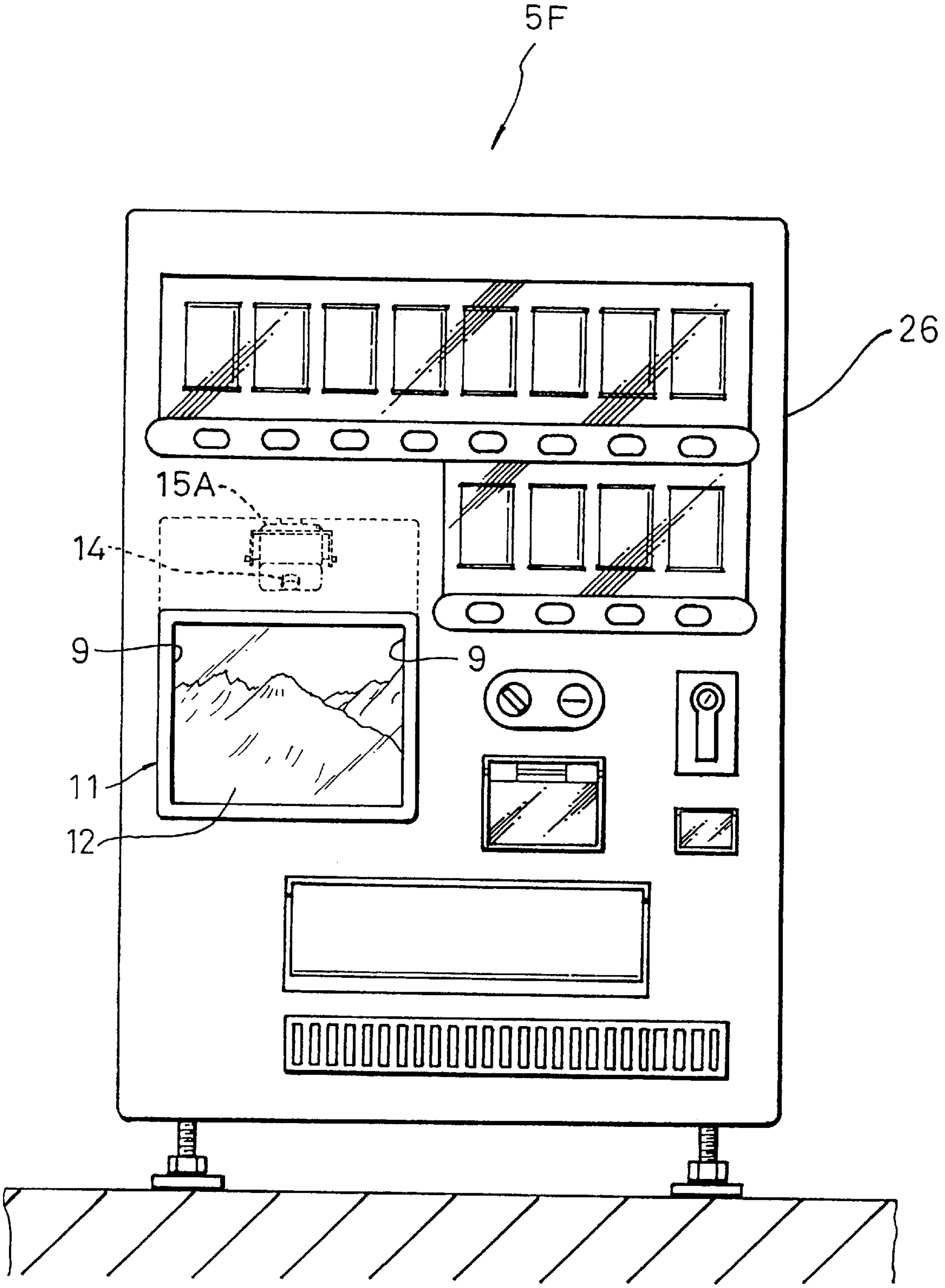
FIG. 22 is a front view of an eighth embodiment of the present invention.
Figure 23:
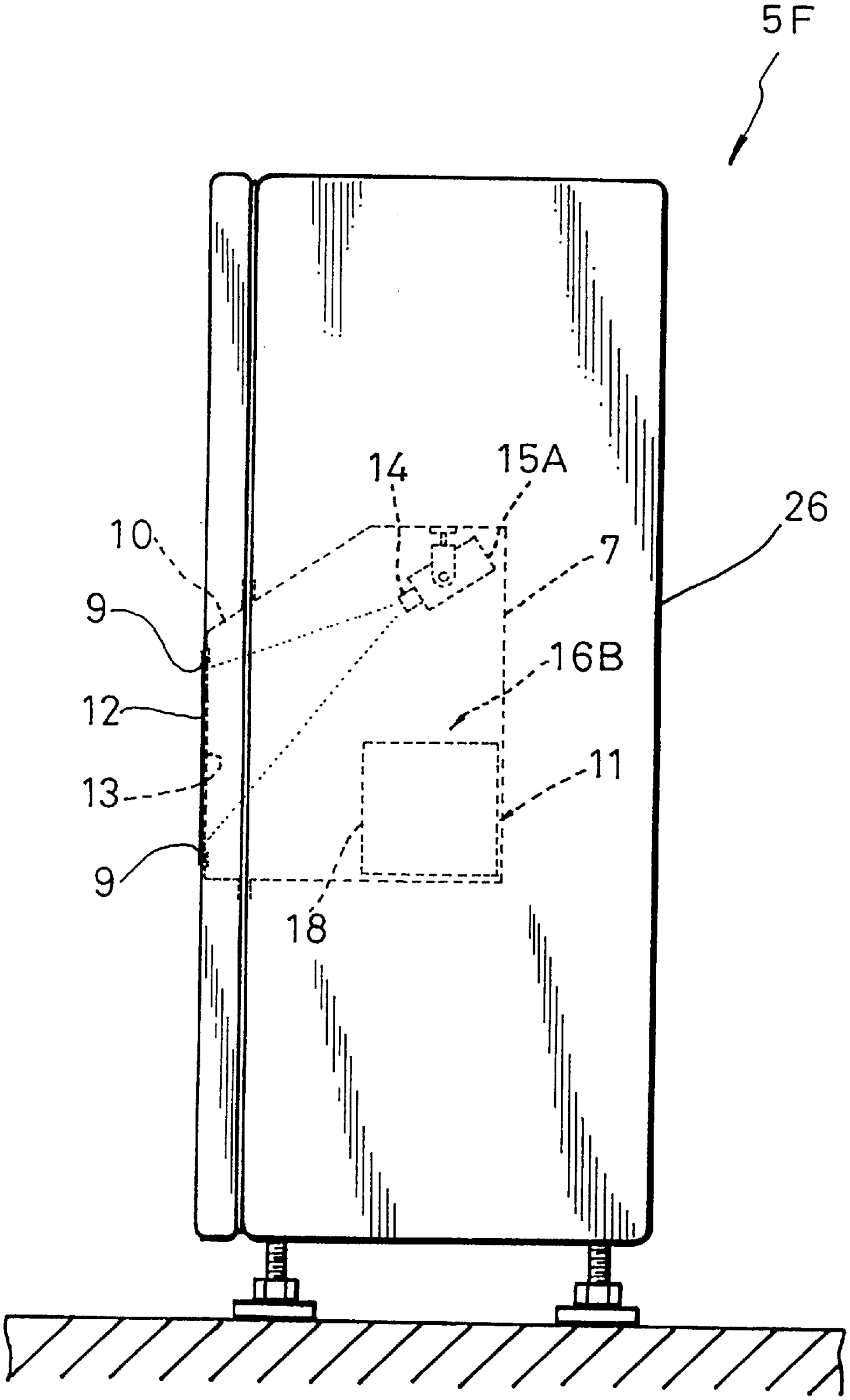
FIG. 23 is a side view of the eighth embodiment of the present invention.

An eighth embodiment of the present invention shown in FIGS. 22 and 23 is distinguished from the fifth embodiment by the fact that the screen box body 11 is formed as one with or is self-contained within the case housing 26 of the vending machine. The screen boxes 5F according to the eighth embodiment will provide the same effects as the fifth embodiment.

Figure 24:
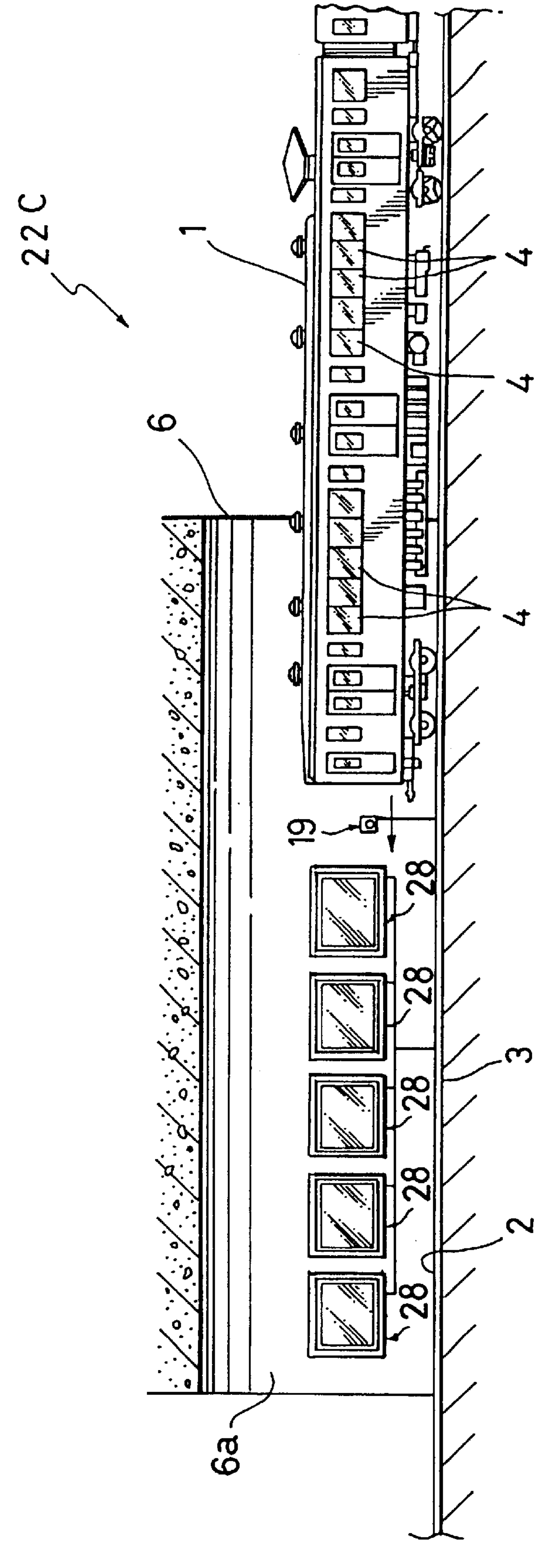
FIG. 24 is a front view of a ninth embodiment of the present invention.
Figure 25:
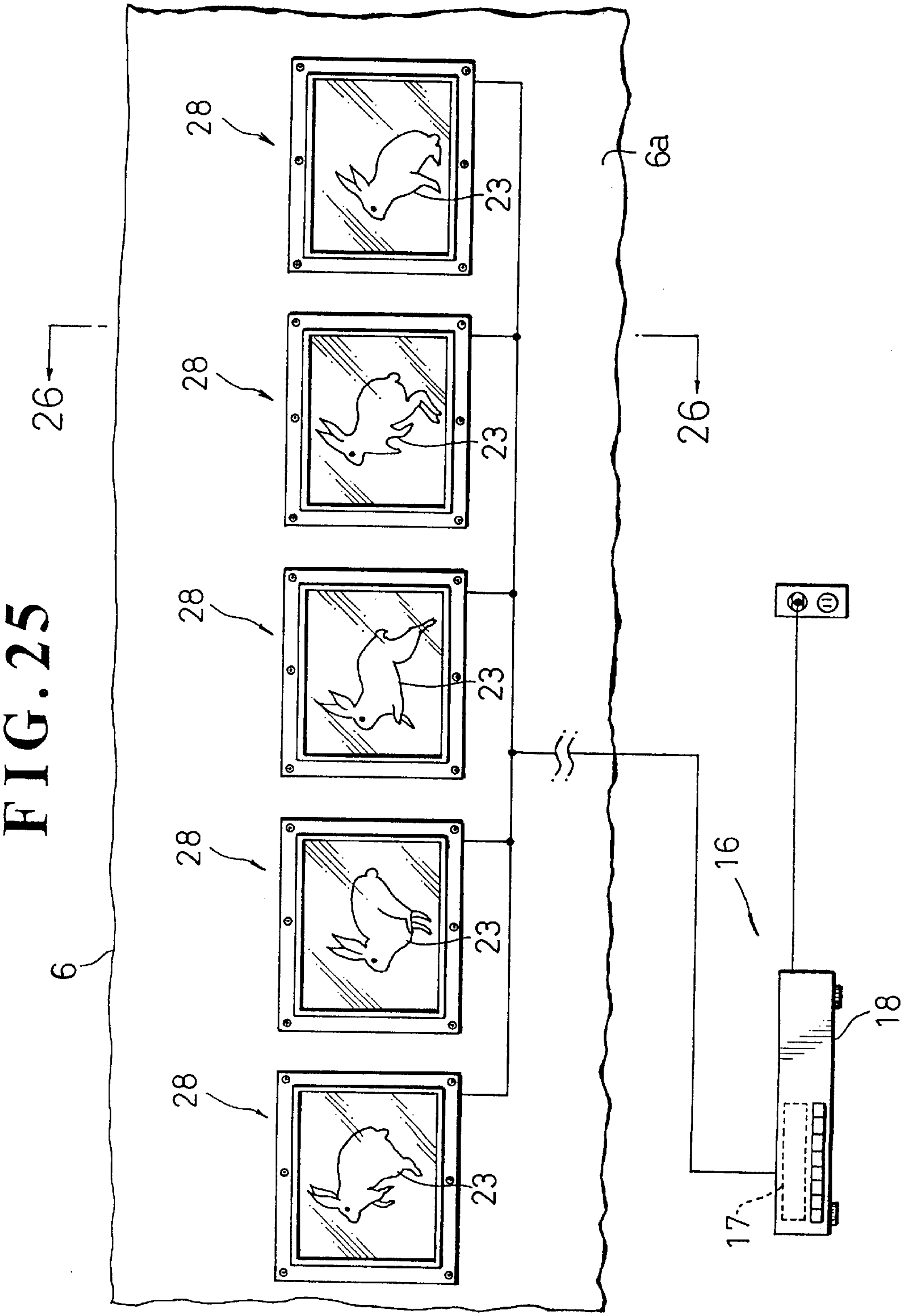
FIG. 25 is an environmental front and schematic view of a liquid crystal display system of the ninth embodiment of the present invention.
Figure 26:
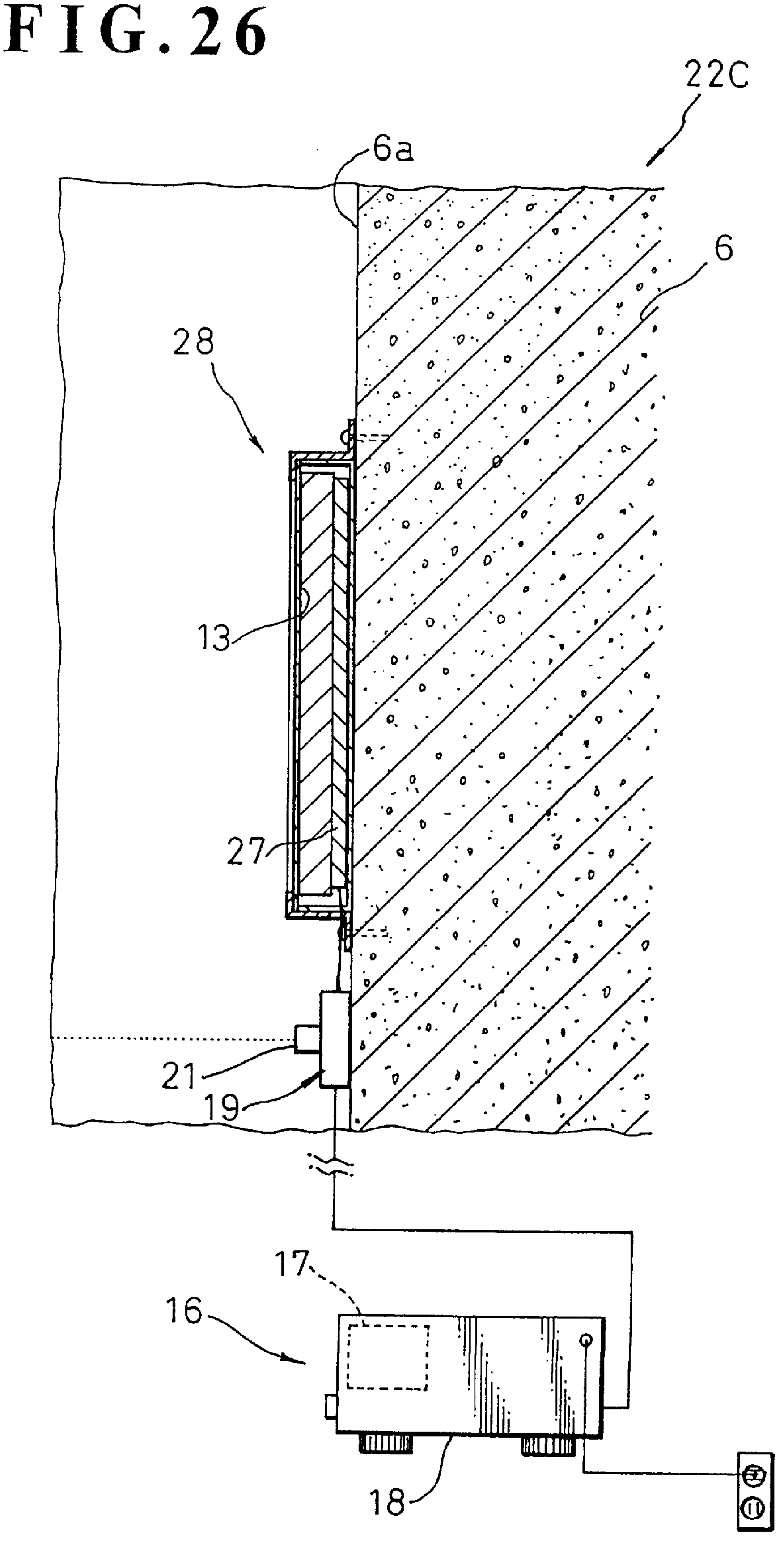
FIG. 26 is a cross-sectional view taken along the line 26—26 of FIG. 25.

A ninth embodiment of the present invention shown in FIGS. 24 and 26 is distinguished from the first embodiment by the fact that the plurality of liquid crystal display devices 28 is used instead of the screen boxes for picture. The liquid crystal display devices 28 have the illuminated backlight 27, the strobe lamp, and/or the flash lamp. The liquid crystal display devices 28 are serially disposed at intervals of a given distance on the inner wall 6*a* of the tunnel 6 provided in place along the traveling of the vehicle 1 so that the display devices 28 can be seen from the windows 4 of the vehicle traveling on the running path 3. A continuous motion picture system 22C with the liquid crystal display devices 28 can supply the still pictures produced by still picture signals from the device for supplying picture signals 16 so that the still pictures of the liquid crystal display devices 28 are seen as a series of the motion picture which people can see continuously from the windows 4 of the vehicle 1.

Although the vehicle 1 traveling on the two rails 2,2 at the running path 3 is explained throughout the first to fourth embodiments of the present invention, they are not limited to this arrangement and may be a moving object, such as an automotive vehicle on a road, an escalator, or an elevator. Moreover, the screen boxes 5 may be set up at an open-air place, except for the inner part of the tunnel.

Additionally, although the present invention is explained for the liquid crystal projectors 15 and 15A throughout each of the embodiments of the present invention, they are not limited to these arrangements and may be used a projector except for the liquid crystal projector.

As set forth above, the advantages of the present invention are as follows:

(1) A continuous motion picture system comprising: a vehicle carrying passengers traveling along a running path; screen boxes serially disposed at intervals of a given distance along the running path, and capable of being seen from the windows of the vehicle in the running direction and capable with projecting still pictures; and means for supplying picture signals.

Therefore, people can see the picture projected onto the back side of the screen from the front side of the screen.

(2) As discussed above, people can see the screen clearly at the open-air place if the projecting is conducted at the place where the place is not exposed the direct rays of the sun.

(3) As discussed above, the suppliers can conduct guide indication, publicity and/or advertisement in efficiency because the still and motion pictures from the device for supplying picture signals can be projected onto the screen through the projector.

(4) As discussed above, the workers can change the projected pictures on the screen by changing the picture signals of the supply device of picture signals.

Accordingly, it is easy to change the pictures and work it.

(5) The claims of 3, 4 and 5 provide the same effects as the paragraphs (2) to (4).

(6) Successive screen boxes for display of a motion picture can be produced thinly and at a low price because the liquid crystal display device having back-light is used in claim 5 of the present invention.

What is claimed is:

1. A continuous motion picture system for operation in conjunction with a vehicle carrying passengers along a running path, comprising:

screen boxes serially disposed at intervals of a given distance along the running path;

said screen boxes each including a display means with a screen for displaying a still picture for a duration of a display period;

distribution means for supplying picture signals of a sequence of frames, which depict motion when viewed sequentially, to said display means of said screen boxes such that each of said display means receives a respective one of said frames of said sequence of frames in correspondence with the serial disposition of said screen boxes; and means for sequentially triggering said screen boxes to individually display said respective one of said frames as a still picture for said display period in correspondence with the vehicle passing said screen boxes so as to reproduce said motion when said screen boxes are sequentially viewed by the passengers of the vehicle.

2. A continuous motion picture system according to claim 1, wherein each of said screen boxes comprises:

a screen box body defining an opening in a front thereof;

said screen being mounted in the opening and having a back side upon which said still picture is projected and a front side at which said still picture is viewed;

said display means being a projector mounted inside said screen box body to project said still picture on said back side of said screen; and said projector including means for receiving said picture signals of said respective one of said frames from the distribution means for supplying picture signals and projecting said respective one of said frames onto the screen as said still picture.

3. A continuous motion picture system according to claim 2, wherein said screen includes a polarized light screen mounted at said back side thereof for receiving a projection of said respective one of said frames.

4. A continuous motion picture system according to claim 1, wherein said screen boxes are respectively disposed on or within vending machines.

5. A continuous motion picture system according to claim 1, wherein said display means is a liquid crystal projector having a blinkable back-light for projecting said still picture for said display period.

6. A continuous motion picture system according to claim 1, wherein said distribution means for supplying picture signals includes a digital video player and a digital signal distributor for distributing signals of said respective ones of said frames to respective ones of said screen boxes.

7. A motion picture system for operation in conjunction with a vehicle carrying passengers along a running path, comprising:

screen boxes serially disposed at intervals of a given distance along the running path;

said screen boxes each including a digital display means with a screen for displaying a still picture for a duration of a display period;

distribution means for supplying digital picture signals of a sequence of frames, which depict motion when viewed sequentially, to said digital display means of said screen boxes such that each of said digital display means receives a digital picture signal representing a respective one of said frames of said sequence of frames in correspondence with the serial disposition of said screen boxes; and triggering means for sequentially triggering said screen boxes to individually display said respective one of said frames as a still picture for said display period in correspondence with the vehicle passing said screen boxes so as to reproduce said motion when said screen boxes are sequentially viewed by the passengers of the vehicle.

8. A motion picture system according to claim 7, wherein each of said display means is a digital image projector for projecting onto said screen and said digital image projector includes means for receiving said digital picture signals of said respective one of said frames from said distribution means.

9. A motion picture system according to claim 8, wherein said digital image projector is a liquid crystal projector having a blinkable back-light for projecting said still picture for said display period responsive to said triggering means.

10. A motion picture system according to claim 8, wherein said distribution means for supplying digital picture signals includes a digital video player and a digital signal distributor for distributing signals of said respective ones of said frames to respective ones of said screen boxes.

11. A motion picture system according to claim 10, wherein said digital signal distributor is a computer receiving said digital picture signals and distributing signals of said respective ones of said frames to respective ones of said screen boxes.

12. A motion picture system according to claim 7, wherein said distribution means for supplying digital picture signals includes a digital video player and a digital signal distributor for distributing signals of said respective ones of said frames to respective ones of said screen boxes.

13. A motion picture system according to claim 12, wherein said digital signal distributor is a computer receiving said digital picture signals and distributing signals of said respective ones of said frames to respective ones of said screen boxes.

14. A motion picture system according to claim 7, wherein said screen boxes are respectively disposed on or within vending machines.

15. A motion picture system for operation in conjunction with a vehicle carrying passengers along a running path, comprising:

displays for displaying digitally encoded images for a duration of a display period, said displays being serially disposed at intervals of a given distance along the running path;

a digital video player for supplying digital picture signals of a sequence of frames which depict motion when viewed sequentially;

distribution means for distributing said digital display signals to said displays such that each of said displays receives a digital picture signal representing a respective one of said frames of said sequence of frames in correspondence with the serial disposition of said displays; and triggering means for sequentially triggering said displays to individually display said respective one of said frames as a still picture for said display period in correspondence with the vehicle passing said displays so as to reproduce said motion when said displays are sequentially viewed by the passengers of the vehicle.

16. A motion picture system according to claim 15, wherein said distribution means is a computer receiving said digital picture signals and distributing signals of said respective ones of said frames to respective ones of said screen boxes.

17. A motion picture system according to claim 15, wherein said distribution means is incorporated into said digital video player.

* * * * *